United States Patent
Agarwal et al.

(10) Patent No.: US 9,729,448 B2
(45) Date of Patent: Aug. 8, 2017

(54) CONGESTION DETECTION USING A DIFFERENTIATED PACKET PAIR

(71) Applicant: International Business Machines Corporation, Armonk, NY (US)

(72) Inventors: Kanak B. Agarwal, Austin, TX (US); Wesley M. Felter, Austin, TX (US); Keqiang He, Madison, WI (US); Eric J. Rozner, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 14/603,311

(22) Filed: Jan. 22, 2015

(65) Prior Publication Data

US 2016/0218976 A1 Jul. 28, 2016

(51) Int. Cl.
  *H04L 12/801* (2013.01)
  *H04L 12/721* (2013.01)
  *H04L 12/863* (2013.01)

(52) U.S. Cl.
  CPC ............ *H04L 47/115* (2013.01); *H04L 45/26* (2013.01); *H04L 47/6215* (2013.01)

(58) Field of Classification Search
  None
  See application file for complete search history.

(56) References Cited

U.S. PATENT DOCUMENTS

| 7,961,637 B2 | 6/2011 | McBeath | |
| 2003/0165149 A1* | 9/2003 | Lin | H04L 12/5693 370/412 |
| 2004/0109417 A1* | 6/2004 | Castro | H04L 67/104 370/238 |
| 2004/0174815 A1* | 9/2004 | Khisti | H04L 12/2697 370/235 |

(Continued)

OTHER PUBLICATIONS

Ergin et al; Using Packet Probes for Available Bandwidth Estimation: A Wireless Testbed Experience, WiNTECH'06, Sep. 29, 2006, Los Angeles, California, USA.

(Continued)

*Primary Examiner* — Hassan Kizou
*Assistant Examiner* — Deepa Belur
(74) *Attorney, Agent, or Firm* — Garg Law Firm, PLLC; Rakesh Garg; Mercedes L. Hobson

(57) ABSTRACT

A method, system, and computer program product for determining a congestion value in a networking component in a data network are provided in the illustrative embodiments. A first packet is set to use a first priority level and a second packet is set to use a second priority level. The second priority level is lower than the first priority level. The second packet is transmitted after the first packet to the networking component, causing the networking component to transmit the first and the second packets after they are received at the networking component. A function is applied to an arrival delay to compute the congestion value of the networking component, wherein the arrival delay comprises a length of an elapsed period between receiving a transmission of the (Continued)

first packet from the networking component and receiving a transmission of the second packet from the networking component.

20 Claims, 6 Drawing Sheets

(56) References Cited

U.S. PATENT DOCUMENTS

| | | | | |
|---|---|---|---|---|
| 2007/0097865 A1* | 5/2007 | Song | ................. | H04J 3/247 |
| | | | | 370/235 |
| 2013/0114421 A1* | 5/2013 | Qian | ................. | H04L 43/0829 |
| | | | | 370/252 |
| 2013/0322252 A1* | 12/2013 | DeCusatis | ................. | H04L 47/33 |
| | | | | 370/236 |
| 2015/0195205 A1* | 7/2015 | Flinta | ................. | H04L 47/22 |
| | | | | 370/230.1 |
| 2015/0244634 A1* | 8/2015 | Azogui | ................. | H04L 47/263 |
| | | | | 370/231 |
| 2015/0277969 A1* | 10/2015 | Strauss | ................. | G06F 9/467 |
| | | | | 707/703 |
| 2015/0280959 A1* | 10/2015 | Vincent | ................. | H04L 67/1097 |
| | | | | 709/203 |
| 2015/0295827 A1* | 10/2015 | Zhu | ................. | H04L 47/12 |
| | | | | 370/230 |
| 2016/0315860 A1* | 10/2016 | Nichols | ................. | H04L 47/11 |

OTHER PUBLICATIONS

Kanuparthy et al; DiffProbe: Detecting ISP Service Discrimination,.
Phaal et al; Packet Sampling Basics, http://www.sflow.org/packetSamplingBasics/index.htm.
Appendix P, Mar. 24, 2017.

\* cited by examiner

CONGESTION DETECTION USING A DIFFERENTIATED PACKET PAIR

TECHNICAL FIELD

The present invention relates generally to a method, system, and computer program product for determining congestion in a networking component in a data communication network. More particularly, the present invention relates to a method, system, and computer program product for congestion detection using a differentiated packet pair.

BACKGROUND

A data network facilitates data transfers between two or more data processing systems. For example, an application executing in one data processing system acts as the sender of the data, and another application executing in another data processing system acts as the receiver of the data. Between the sender system (also referred to herein as "host" or "sender node") and the receiver system (also referred to herein as "receiver node"), the data follows a data path that comprises one or more links between networking components, such as routers and switches.

In a data processing environment, such as in a datacenter, many data processing systems are connected via a data network. At any given time, several systems may be transmitting data of various sizes to several other systems. Many of these data transmissions can utilize a common link in the network, to get from their respective sender systems to their respective receiver systems.

A data communication link in a network can become congested when more than a threshold amount of data traffic tries to use the link during a given period. The data traffic of some data flows (hereinafter, "flow", or "flows") appears in bursts, causing the data traffic on a link to spike. A link can also be over-subscribed, i.e., too many flows may try to use the link at a given time. Flow collisions, packet loss, network latency, and timeouts are some examples of problems that are caused when the utilization of a link exceeds a threshold.

Some flows in a network are small flows and some are large flows. A flow that transmits less than a threshold amount of data in a given period is a small flow. A flow that transmits the threshold amount of data or more in a given period is a large flow.

The data of a flow comprises packets of data. Generally, the larger the flow, the more the number of the packets therein. The packets of the various flows wanting to use a link are queued. For using a link, the packets of a small flow that are queued after the packets of a large flow will have to wait significantly longer to use the link, as compared to when the packets of the small flow are queued after the packets of another small flow.

Typically, over a period of operation in a data network, small flows outnumber large flows but data transmitted by large flows exceeds the data transmitted by small flows. Thus, the use of communication links in a network by a mix of large and small flows often results in unacceptable performance of applications and operations related to the small flows, because of the large flows.

SUMMARY

The illustrative embodiments provide a method, system, and computer program product for congestion detection using a differentiated packet pair. An embodiment includes a method for determining a congestion value in a networking component in a data network. The embodiment sets, at an application executing in a data processing system, a first packet to use a first priority level. The embodiment sets, at the application, a second packet to use a second priority level, wherein the second priority level is lower than the first priority level. The embodiment transmits the second packet after the first packet to the networking component, wherein the transmitting causes the networking component to transmit the first packet and the second packet from the networking component after the first packet and the second packet are received at the networking component. The embodiment determines an arrival delay, wherein the arrival delay comprises a length of an elapsed period between receiving a transmission of the first packet from the networking component and receiving a transmission of the second packet from the networking component. The embodiment applies a function to the arrival delay to compute the congestion value of the networking component.

Another embodiment includes a computer usable program product comprising a computer readable storage device including computer usable code for determining a congestion value in a networking component in a data network.

Another embodiment includes a data processing system for determining a congestion value in a networking component in a data network.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
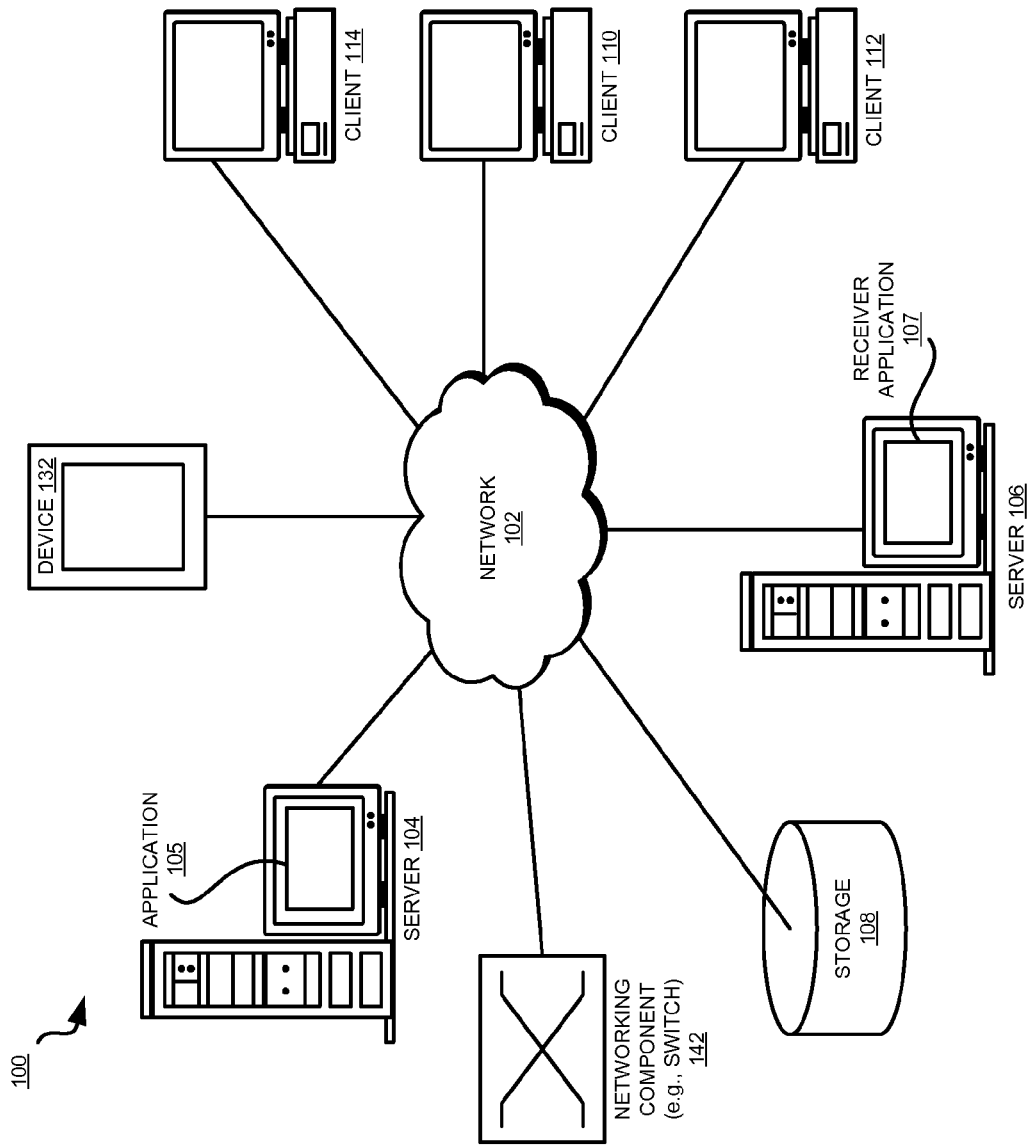
FIG. 1 depicts a block diagram of a network of data processing systems in which illustrative embodiments may be implemented.

The illustrative embodiments recognize that a delay in transmitting a data packet from one system to another in a given data network depends on the congestion in the networking components through which the packet has to pass. The illustrative embodiments recognize that the congestion in a networking component is a function of a number of packets that must be transmitted out of the networking component before the packet in question can be transmitted.

The illustrative embodiments recognize that even if, at a given instant in time, the total number of packets congesting a networking component is fixed, the delays experienced by packets of different priorities will be different. Thus, the illustrative embodiments recognize that in a networking component, the delay of a packet is also a function of the packet's priority. More particularly, the delay of the packet is a function of the packet's priority relative to the priorities of the other packets.

Modern networking components, such as routers and switches, perform priority based packet handling. For example, a presently available switch maintains several queues in which the switch places the incoming packets according to their priorities. A particular queue in the switch queues packets of a particular priority.

The switch removes the packets from the queues in the order of the priority associated with the queues. For example, assume that the packets in a network can have ten priority levels ranging from the highest priority of 0 to the lowest priority of 9. Further assume, as a simplified example, that the switch manages only one queue per priority level. Accordingly, the switch has queue Q0 in which the switch queues any packets that arrive into the switch with priority level 0. Similarly, the switch has queues Q1-Q9 for queuing the packets that arrive in the switch with priorities 1-9, respectively.

A scheduler in the switch empties the highest priority queue, if any packets exist therein, and progressively empties the queues of progressively lower priorities in order, if any packets exist in those queues. As can be seen, if a packet of a given priority exists in the switch where packets of higher priority are queued, the transmission of the packet out of the switch will be delayed until the packets from the queues of higher priority packets have been transmitted.

Thus, the illustrative embodiments recognize that the delay of a packet is a function of not only the number of packets ahead of the packets at a networking component but also the packet's priority relative to the priorities of those other packets. The illustrative embodiments recognize that in a networking component, the longer is the delay of a packet of a given priority when the higher is the number of packets with higher than the given priority that congest the networking component. Because, generally, the packets of a given flow have the same or similar priorities, the delay of a packet of a given flow is indicative of the delay of the flow as a whole.

Thus, measuring the congestion at a networking component in a network is important in making flow-related routing decisions. For example, if the congestion of a particular networking component is known to exceed a threshold level of congestion, a flow can be directed in the network in such a way that the packets of the flow use a different networking component instead of the congested networking component to reach their destination.

Presently, some techniques are available for helping in this regard. For example, "ping" is a well known probing technique that seeks to determine a round trip delay between a sender system and a receiver system. However, this method determines the latency of an entire round-trip path—from a sender system to a receiver system, and back to the sender system. The illustrative embodiments recognize that the round-trip path latency is not helpful in determining which networking components to avoid for the purposes of traffic engineering and directing flows in a data network.

As another example, a packet pair probing technique is presently available and used for determining the capacity of a link in the data network. Two identically configured packets are transmitted from a sender system, to traverse a particular link in the network. A time elapsed between transmitting the two packets on the tested link is a function of the link's capacity. For example, assume that the identical packets are each of size 1000 bytes (1 KB), and the links in the network are 1,000,000,000 bytes/second (1 GB/s) capacity links. If the full capacity of 1 GB/s is available on a link, the first of the two packets will take 1 microsecond to transmit after which the second packet will be transmitted. When all the links are performing with this configured capacity, a delay seen between the two identical packets on a receiving system should therefore be 1 microsecond. A link's capacity can be reduced not only by congestion in the network, but for many other reasons as well, including reasons such as an equipment configuration problem. Suppose a link on which the two identical packets travel has a reduced capacity of 100,000,000 bytes/second (100 MB/s). The two packets traversing this reduced capacity link now arrive with a delay of 10 microseconds between the two packets.

The illustrative embodiments recognize that even this packet pair technique is unsuitable for measuring the congestion at a networking component, which operates at an end of a link. For example, in the above example, even though the delay has increased, all that can be said based on the delay is that something in not operating as expected in the path that the two identical packets took. From the measured delay, one cannot say with any definiteness whether the delay is because a link capacity has reduced, congestion exists somewhere along the path, a misconfiguration or other condition exists in a link, a misconfiguration or other condition exists at a networking component, or some combination thereof.

Other techniques, such as packet sampling, also seek to determine congestion in a network. However, the illustrative embodiments recognize that they either impose too great a cost on other network traffic when operated, require special centralized equipment, or can be employed only on a limited basis when certain conditions exist in the network.

The illustrative embodiments used to describe the invention generally address and solve the above-described problems and other problems related to determining congestion in a networking component in a network. The illustrative embodiments provide a method, system, and computer program product for congestion detection using a differentiated packet pair.

At a sender data processing system, an embodiment constructs two packets for determining congestion in a particular networking component. The packets are configured so that they will both reach that particular networking component over the same network path. Any suitable multipath routing method for routing a packet to a certain networking component, such as equal cost multi-path (ECMP) routing or other similarly purposed method, can be used to configuring the packets for reaching the particular networking component.

The embodiment sets different priorities in the two packets. For example, the embodiment sets one of the two packets (P1) a the highest priority level used in the network, and sets the other packet (P2) at a priority level of a flow or normal traffic that originates from the sender system. The embodiment sends the differently prioritized packets to a receiver data processing system, such as to a receiver application executing in the receiver system. Generally, P2 can be set to a priority of any QoS priority-level for which the congestion measurement is desired, as long as P2's priority is lower than P1's priority.

Packet P1 and P2 arrive at the particular networking component. The networking component queues packet P1 in the queue that the networking component manages for the highest priority packets. Similarly, the networking component queues packet P2 in a queue that corresponds to the priority level set for packet P2.

Usually, data traffic in a data network does not use the highest priority, or uses the highest priority sparingly, because the network performance impact of high priority packets is significant. Accordingly, packet P1 occupies a position in the highest priority queue, either behind zero other highest priority packets, or behind a number of other highest priority packets that is significantly less than the number of packets in the queues of priority levels that are used by the normal flows in the data network. Positioned in this manner, packet P1 is transmitted from the networking component with zero or minimal delay from zero or negligible number of other highest priority packets, and certainly without any delay caused by the vast majority of other packets of other priorities queued in the networking component.

Packet P2, on the other hand, occupies a position in the queue corresponding to its priority, which would be behind queues of all packets that had a priority level higher than the priority level of packet P2. Positioned in this manner, packet P2 is transmitted from the networking component when all the other queued packets of higher priorities have been transmitted from the networking component.

The receiver application receives packets P1 and P2. Even though P2 was transmitted by the sender system immediately after P1, P2 arrives at the receiver system with a delay caused by all the packets that were congesting the queues of relatively higher priority in the particular networking component. Thus, the time elapsed between the receiving of packet P1 and the receiving of packet P2 is a direct indication of the congestion and queuing delays in the particular networking component. Regardless of how other factors in network change and how many routers, switches, or other networking components the packets encounter in their path, the P1-P2 delay contributed by the congestion in the particular networking component remains unchanged. For example, suppose the total delay between P1 and P2 is D. D1 is a component of D that is contributed by the congestion in the particular networking component and D2 is the delay contributed by other factors in the network. D1+D2=D. Regardless of how D2 changes, the changes in D2 only affect D, not D1. Therefore, D=D1 when no other network factors are causing additional delays, or D is some function of D1, whereby the congestion in the particular networking component is calculable using that function on D.

An embodiment calculates the delay (D) between receiving the two differently prioritized packets. The embodiment uses the calculated delay and a suitable function such as fn (D minus a known D2), to determine a congestion value at the particular networking component.

The above example operation of certain embodiments is described with respect to two packets—one packet of the highest priority and another packet of a normal flow priority—only as non-limiting examples. These examples of numbers of packets and priorities are not intended to be limiting. From this disclosure, those of ordinary skill in the art will be able to conceive many other numbers of packets and priorities to configure in an embodiment and the same are contemplated within the scope of the illustrative embodiments.

For example, operating in the manner of the above example, an embodiment reveals the congestion, to wit, the number of packets congesting the networking component between the highest priority packet P1 and the packet P2 of the given priority. If three packets were similarly dispatched from the sender system—P1 with the highest priority, P2 with an intermediate priority, and P3 with a lowest priority, the delay between receiving P1 and P2 informs about the congestion caused by packets of priorities between highest priority and the intermediate priority. Similarly, the delay between receiving P2 and P3 informs about the congestion caused by packets of priorities between the intermediate priority and the lowest priority. Likewise, the delay between receiving P1 and P3 informs about the congestion caused by packets of priorities between highest priority and the lowest priority.

Thus, several packets of different priorities are usable to collect information about congestion in a networking component from the packets in different priority ranges. If the congestion caused by packets of a certain priority range were desired, an embodiment can be configured to send packets with priorities set accordingly on each end of the range, and the congestion measured in the manner described herein.

A method of an embodiment described herein, when implemented to execute on a device or data processing system, comprises substantial advancement of the functionality of that device or data processing system in determining an amount of congestion at a particular networking component in a data network. For example, in order to determine, the prior-art either determines the latency of a round-trip path, latency introduced by a link in the path, or samples packets for delays randomly. None of these techniques is suitable for determining the one-way congestion and queuing delay in a particular networking component flexibly and accurately. In contrast, an embodiment transmits two or a small number of packets, and determines an amount of congestion in a particular networking component, caused by all or a range of packet priorities in the networking component, in a lightweight manner without requiring special equipment or burdening the network. Such manner of lightweight, flexible, accurate, and configurable manner of determining congestion in a particular networking component is unavailable in presently available devices or data processing systems. Thus, a substantial advancement of such devices or data processing systems by executing a method of an embodiment enables accurate and on-demand congestion determination for routing data flows and avoiding congested networking components in a data network.

The illustrative embodiments are described with respect to certain types and numbers of packets, networks, priorities, queues, delays, networking components, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
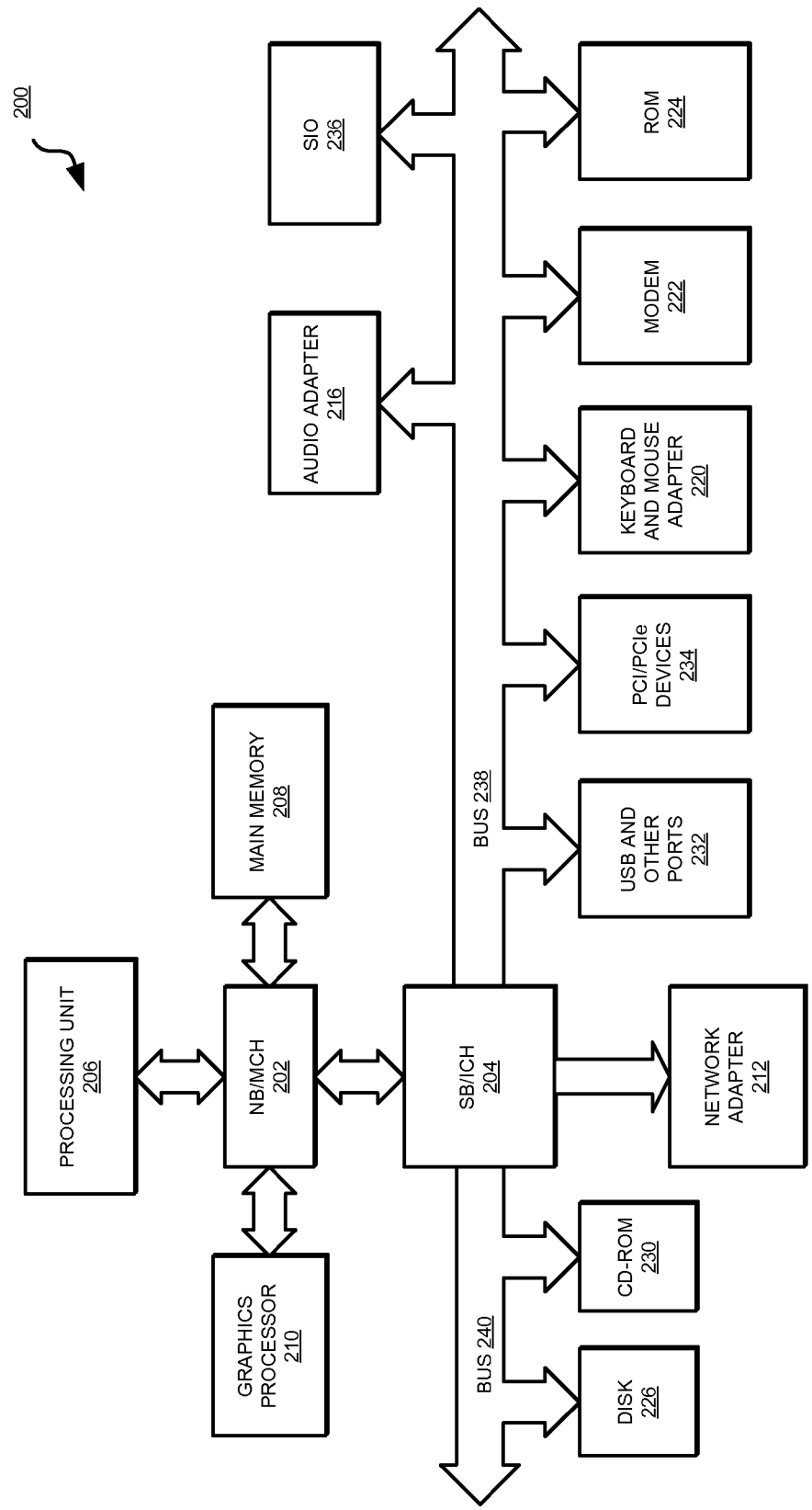
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Server 104 operates as a sender system and executes application 105 thereon. Application 105 implements an embodiment described herein. Networking component 142 is an example of a networking component in which application 105 can determine a level of congestion as described herein. Networking component 142 can be any suitable networking component, such as a networking switch, which implements packet priority based queues. These packet priority based queues are also known as Quality of service queues or "QoS queues". Server 106 is an example of a receiver data processing system, in which receiver application 107 executes. Application 105 sends the packets with differentiated priorities to receiver application 107. Receiver application 107 computes the delay between the arrivals of the packets with differentiated priorities. Receiver application 107 supplies the computed delay to application 105. Application 105 calculates a level of congestion in networking component 142 using a function on the computed delay.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
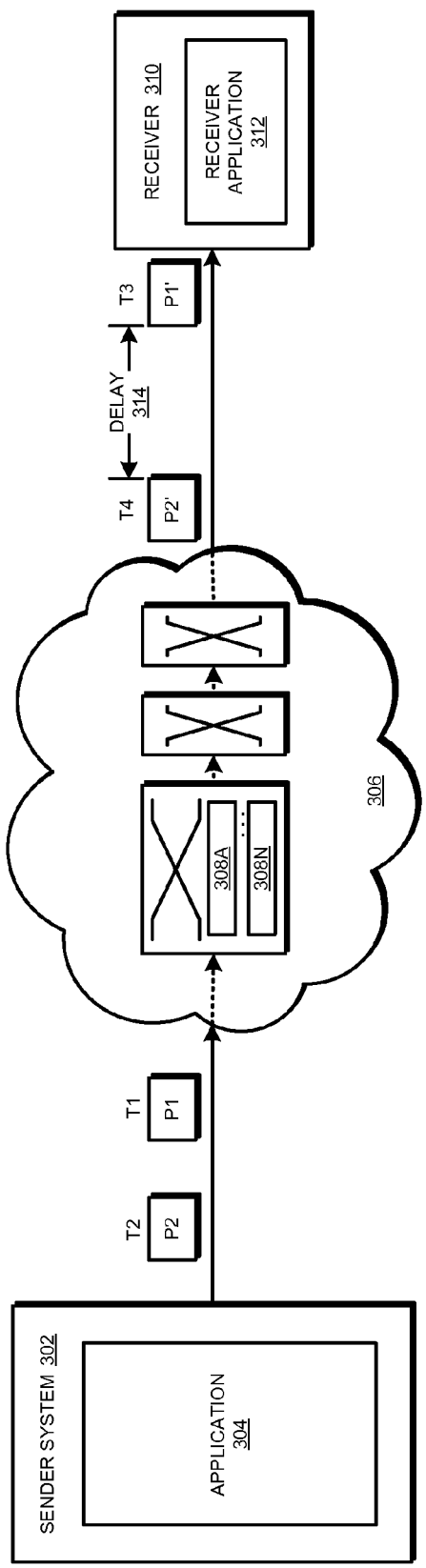
FIG. 3 depicts a block diagram of an example configuration for congestion detection using a differentiated packet pair in accordance with an illustrative embodiment.

With reference to FIG. 3, this figure depicts a block diagram of an example configuration for congestion detection using a differentiated packet pair in accordance with an illustrative embodiment. Sender system 302 is an example of server 104 in FIG. 1. Application 304 is an example of application 105 in FIG. 1. Network 306, networking component 308, receiver system 310, and receiver application 312 are examples of network 102, networking component 142, receiver system 106, and receiver application 107, respectively in FIG. 1.

The depictions of FIG. 3 use a packet pair as a non-limiting example for clarity, although any number of packets can be used in an embodiment to determine different causes of congestion in networking component 308, as described elsewhere in this disclosure. The description of the depicted configuration uses a packet of the highest priority and a packet of a priority level N as non-limiting examples for clarity, although any pair of different priority levels can be used in an embodiment for determining specific cause of congestion in networking component 308, as described elsewhere in this disclosure.

Application 304 configures packets P1 and P2 for determining congestion in networking component 308. Application 304 transmits packet P1 at time T1, and packet P2 at time T2 after time T1, with no intervening packet transmissions between times T1 and T2 from sender system 302. Packets P1 and P2 are configured to reach networking component 308. Application 304 configures packet P1 to be a packet of a first priority level, e.g., the highest priority level used in network 306. Application 304 configures packet P2 to be a packet of a second priority level, e.g., priority level N commonly used by flows originating from sender system 302.

Packets P1 and P2 reach networking component 308. Networking component 308 queues packet P1 in queue 308A, which in this example is configured to queue packets of the highest priority. Networking component 308 queues packet P2 in queue 308N, which in this example is configured to queue packets of priority N. Any number or size of queues may be configured for a particular priority level in networking component 308. Any total number of queues may be configured in this manner to accommodate any number of priority levels in networking component 308.

Networking component 308 transmits packets P1 and P2 out of queues 308A and 308N, respectively, depending upon the depth of those queues, and particularly for packet P2, the depths of the intervening queues between queues 308A and 308N. Packets P1 and P2 may travel through any number and types of networking components in network 306 before reaching receiver system 310.

Packet P1 reaches receiver system 310 as packet P1' and time T3. Packet P2 reaches receiver system 310 as packet P2' and time T4. Receiver application 312 determines delay 314 between times T3 and T4. A level or amount of congestion in networking component 308 can be determined using delay 314. In one embodiment, receiver application 312 computes this level or amount of congestion in networking component 308 using delay 314. In another embodiment, receiver application 312 sends delay 314 to application 304, and application 304 computes this level or amount of congestion in networking component 308 using delay 314 received from receiver application 312.

Figure 4:
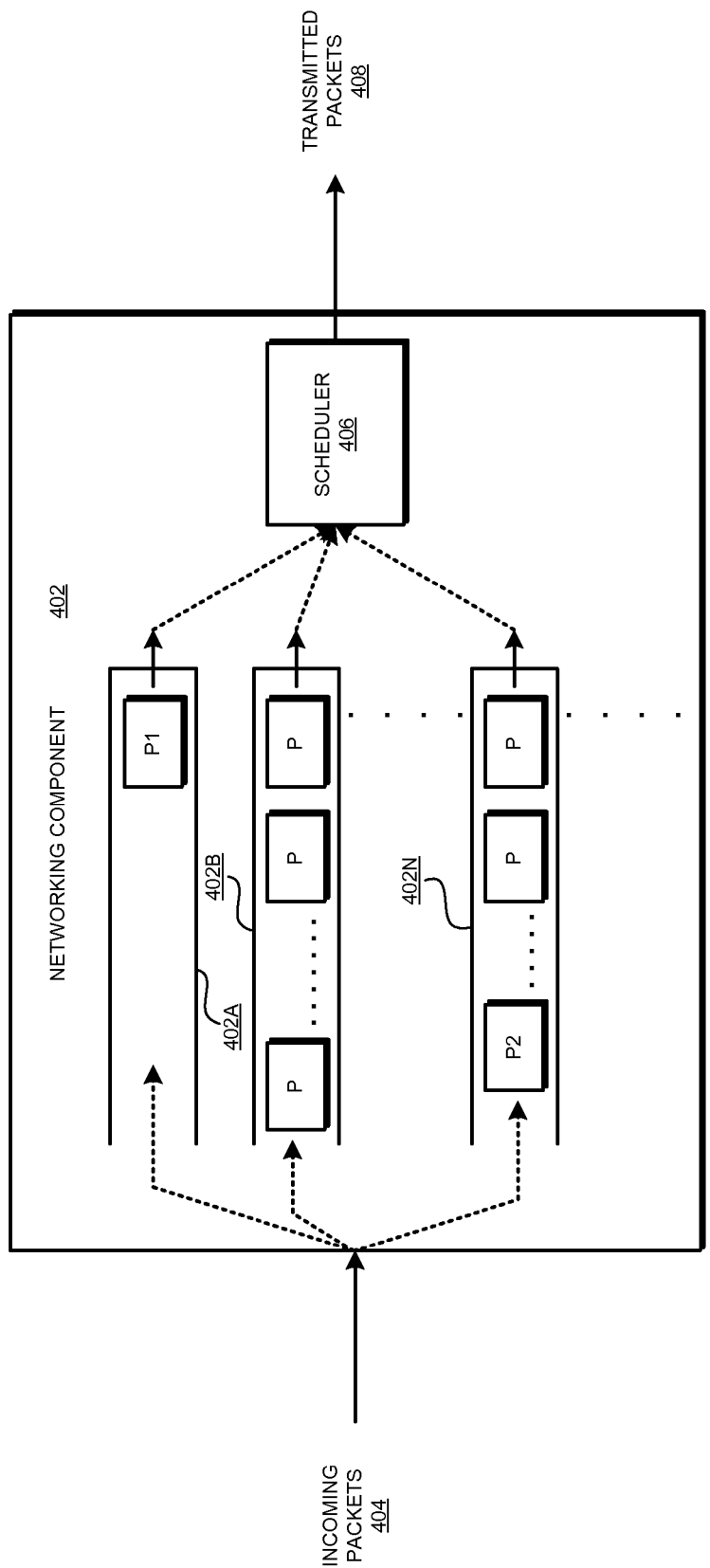
FIG. 4 depicts a block diagram of an example differentiated priority packet pair passing through an example congested networking component in accordance with an illustrative embodiment.

With reference to FIG. 4, this figure depicts a block diagram of an example differentiated priority packet pair passing through an example congested networking component in accordance with an illustrative embodiment. Networking component 402 is an example of networking component 308 in FIG. 3. Packets P1 and P2 are packets P1 and P2 transmitted by sender system 302 and received by networking component 308 in FIG. 3.

Incoming packets 404 comprise packets of various priorities from various flows from various sender systems in a given network. Networking component 402 receives packets P1 and P2 in such a mix of incoming packets 404. Recall from the description of FIG. 3 that packet P1 has the highest priority in the network where networking component 402 is operating, e.g., priority 0. Accordingly, networking component 402 queues packet P1 in queue 402A, which is designated in networking component 402 for packets of priority 0. As depicted, queue 402A was empty prior to the arrival of packet P1, and therefore packet P1 occupies the first position in queue 402A. If other sender systems in the network also use priority 0 packets, queue 402A may have some priority 0 packets ahead of packet P1 in queue 402A.

Queue 402B is another example queue in which packets of other priority—lower than priority 0 but higher than priority N of packet 2—are queued. Any number of packets (generically labeled P) can be queued in the queues of networking component 402.

Packet P2 of priority N is queued in queue 402N. As shown, packet P2 is queued after some other packets of priority N in queue 402N. Additional queues for queuing packets of priority lower than N may also exist in networking component 402. Such queues are denoted by the ellipses below queue 402N but are not expressly depicted in FIG. 4 for clarity.

Queues 402A-402N and additional lower priority queues emit packets from their heads to scheduler 406. Scheduler 406 transmits packets 408 in the order of their priority.

Figure 5:
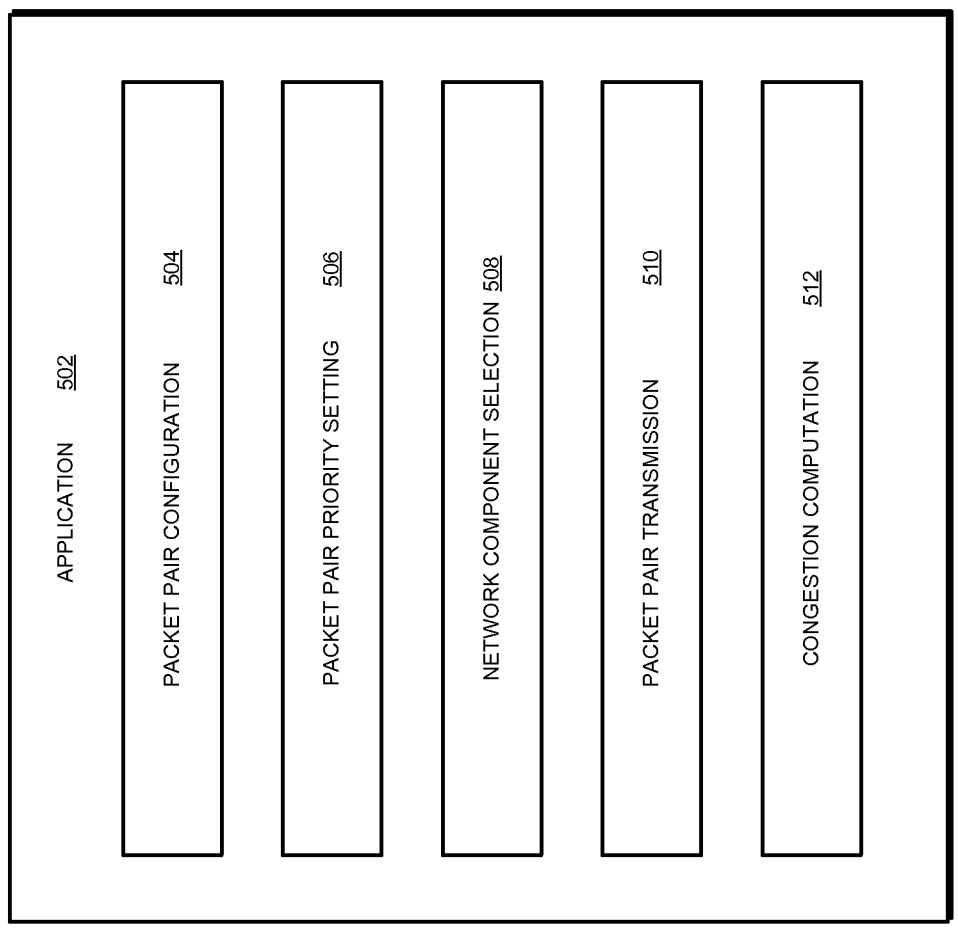
FIG. 5 depicts a block diagram of an example application for congestion detection using a differentiated packet pair in accordance with an illustrative embodiment.

With reference to FIG. 5, this figure depicts a block diagram of an example application for congestion detection using a differentiated packet pair in accordance with an illustrative embodiment. Application 502 is an example of application 304 in FIG. 3.

Component 504 constructs at least a pair of packets for determining one or more levels of congestion at a networking component in a data network. For example, component 504 configures any header values in such packet pair or pairs to indicate to the network and the components operating therein a purpose of the packets. Note that any such special-purpose headers are optional in a packet pair.

Component 506 sets the differentiated priorities in a packet pair constructed by component 504. For example, as described with respect to FIG. 4, component 506 sets the priority of a first packet in a packet pair to a first priority level, e.g., the highest priority level used in the network. Similarly, component 506 sets the priority of a second packet in a packet pair to a second priority level, e.g., the priority level normally used by an outbound flow from the sender system where application 502 is executing.

Component 508 configures the packet pair so that each packet of the packet pair reaches the networking component whose congestion level is to be determined. For example, component 506 configures packets P1 and P2 of FIG. 3 to reach networking component 308 in FIG. 3.

Component 510 transmits the packet pair. The packet with the higher priority between the two packets is transmitted first. The second packet in the pair is transmitted after the first pair with minimal delay and no other packets intervening, to avoid introducing a delay between the two packets at the onset.

Component 512 receives the arrival delay information from a receiver application. For example, component 512 receives delay 314 in FIG. 3, from receiver application 312 in FIG. 3. Component 512 performs the computation of a value of the congestion at the networking component by applying a suitable function to the arrival delay information.

Figure 6:
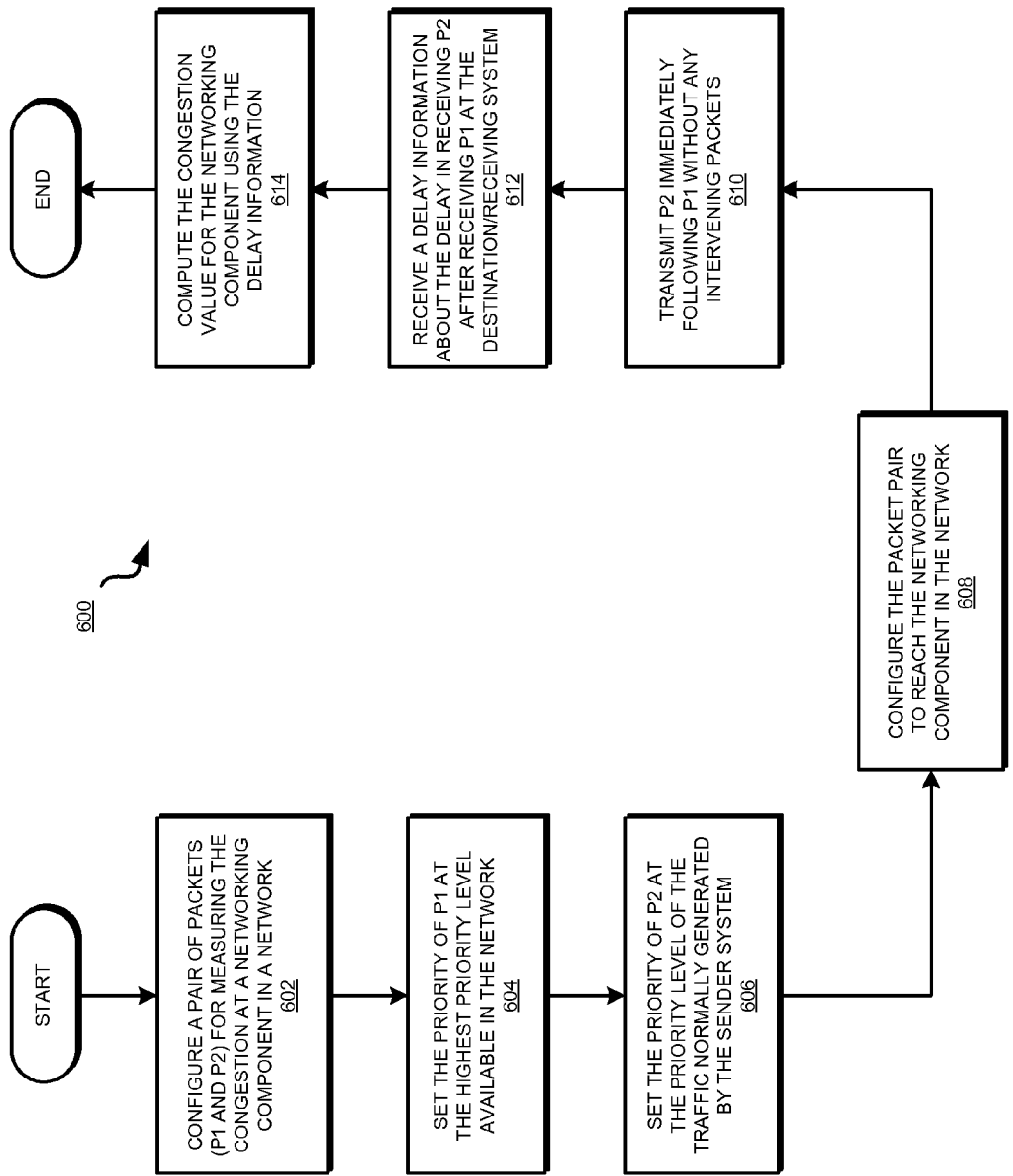
FIG. 6 depicts a flowchart of an example process for congestion detection using a differentiated packet pair in accordance with an illustrative embodiment.

With reference to FIG. 6, this figure depicts a flowchart of an example process for congestion detection using a differentiated packet pair in accordance with an illustrative embodiment. Process 600 can be implemented in application 502 in FIG. 5.

The application configures at least a pair of packets, e.g., packets P1 and P2 as described in FIG. 3-5, for measuring the congestion at a networking component, e.g., in networking component 402 in FIG. 4 (block 602). The application sets the priority of the first packet in the pair at a first priority level, e.g., the highest priority level available for use in a given network (block 604).

The application sets the priority of the second packet in the pair to a priority level used by normal traffic generated by the sender system where the application is executing (block 606). The application configures the packet pair to reach the networking component whose congestion is to be measured (block 608). The application transmits the second packet immediately following the first packet without any intervening packet transmissions (block 610).

The application receives an arrival delay information about the delay in receiving the second packet after receiving the first packet at a receiver system (block 612). The application computes the congestion value of the networking component using the arrival delay information (block 614). The application ends process 600 thereafter.

Thus, a computer implemented method, system or apparatus, and computer program product are provided in the illustrative embodiments for congestion detection using a differentiated packet pair. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining a congestion value in a networking component in a data network, the method comprising:
   setting, at an application executing in a data processing system, a first packet to use a first priority level;
   setting, at the application, a second packet to use a second priority level, wherein the second priority level is lower than the first priority level;
   transmitting the second packet after the first packet to the networking component, wherein the transmitting causes the networking component to transmit the first packet and the second packet from the networking component after the first packet and the second packet are received at the networking component;
   determining an arrival delay, wherein the arrival delay comprises a length of an elapsed period between receiving a transmission of the first packet from the networking component and receiving a transmission of the second packet from the networking component; and
   applying a function to the arrival delay to compute the congestion value of the networking component.

2. The method of claim 1, wherein the arrival delay corresponds to a number of congesting packets in the networking component, and wherein the number of the congesting packets comprises packets having priorities not higher than the first priority and not lower than the second priority.

3. The method of claim 1, further comprising:
   setting a third packet to use a third priority level, wherein the third priority level is lower than the second priority level;
   transmitting the third packet after the second packet to the networking component, wherein the transmitting the third packet causes the networking component to transmit the third packet after the third packet is received at the networking component using a scheduler; and
   determining a second arrival delay, wherein the arrival delay comprises a length of a second elapsed period between receiving a transmission of the second packet from the networking component and receiving a transmission of the third packet from the networking component.

4. The method of claim 3, wherein the second arrival delay corresponds to a second number of congesting packets in the networking component, and wherein the second number of the congesting packets comprises packets having priorities not higher than the second priority and not lower than the third priority.

5. The method of claim 3, wherein the second arrival delay corresponds to a second number of congesting packets in the networking component, and wherein the second number of the congesting packets comprises packets having priorities not higher than the second priority and not lower than the third priority, further comprising:
   computing a second congestion value of the networking component by applying the function to a sum of the arrival delay and the second arrival delay.

6. The method of claim 1, wherein the first priority level is a highest priority level available in the data network.

7. The method of claim 1, further comprising:
   causing, responsive to setting the first priority, the first packet to be queued in a first queue at the networking component, wherein the first queue is usable to queue only packets having the first priority.

8. The method of claim 1, further comprising:
   causing, responsive to setting the second priority, the second packet to be queued in a second queue at the networking component, wherein the second queue is usable to queue only packets having the second priority.

9. The method of claim 1, wherein the second priority level is a priority level used by a packet of an outbound data flow from the data processing system.

10. The method of claim 1, wherein no other packet transmission occurs on the network from the data processing system between the transmitting of the first packet and the second packet.

11. A computer usable program product comprising a computer readable storage device including computer usable code for determining a congestion value in a networking component in a data network, the computer usable code comprising:
    computer usable code for setting, at an application executing in a data processing system, a first packet to use a first priority level;
    computer usable code for setting, at the application, a second packet to use a second priority level, wherein the second priority level is lower than the first priority level;
    computer usable code for transmitting the second packet after the first packet to the networking component, wherein the transmitting causes the networking component to transmit the first packet and the second packet from the networking component after the first packet and the second packet are received at the networking component;
    computer usable code for determining an arrival delay, wherein the arrival delay comprises a length of an elapsed period between receiving a transmission of the first packet from the networking component and receiving a transmission of the second packet from the networking component; and
    computer usable code for applying a function to the arrival delay to compute the congestion value of the networking component.

12. The computer usable program product of claim 11, wherein the arrival delay corresponds to a number of congesting packets in the networking component, and wherein the number of the congesting packets comprises packets having priorities not higher than the first priority and not lower than the second priority.

13. The computer usable program product of claim 11, further comprising:
   computer usable code for setting a third packet to use a third priority level, wherein the third priority level is lower than the second priority level;
   computer usable code for transmitting the third packet after the second packet to the networking component, wherein the transmitting the third packet causes the networking component to transmit the third packet after the third packet is received at the networking component using a scheduler; and
   computer usable code for determining a second arrival delay, wherein the arrival delay comprises a length of a second elapsed period between receiving a transmission of the second packet from the networking component and receiving a transmission of the third packet from the networking component.

14. The computer usable program product of claim 13, wherein the second arrival delay corresponds to a second number of congesting packets in the networking component, and wherein the second number of the congesting packets comprises packets having priorities not higher than the second priority and not lower than the third priority.

15. The computer usable program product of claim 13, wherein the second arrival delay corresponds to a second number of congesting packets in the networking component, and wherein the second number of the congesting packets comprises packets having priorities not higher than the second priority and not lower than the third priority, further comprising:
   computer usable code for computing a second congestion value of the networking component by applying the function to a sum of the arrival delay and the second arrival delay.

16. The computer usable program product of claim 11, wherein the first priority level is a highest priority level available in the data network.

17. The computer usable program product of claim 11, further comprising:
   computer usable code for causing, responsive to setting the first priority, the first packet to be queued in a first queue at the networking component, wherein the first queue is usable to queue only packets having the first priority.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A data processing system for determining a congestion value in a networking component in a data network, the data processing system comprising:
   a storage device, wherein the storage device stores computer usable program code; and
   a processor, wherein the processor executes the computer usable program code, and wherein the computer usable program code comprises:
   computer usable code for setting, at an application executing in a data processing system, a first packet to use a first priority level;
   computer usable code for setting, at the application, a second packet to use a second priority level, wherein the second priority level is lower than the first priority level;
   computer usable code for transmitting the second packet after the first packet to the networking component, wherein the transmitting causes the networking component to transmit the first packet and the second packet from the networking component after the first packet and the second packet are received at the networking component;
   computer usable code for determining an arrival delay, wherein the arrival delay comprises a length of an elapsed period between receiving a transmission of the first packet from the networking component and receiving a transmission of the second packet from the networking component; and
   computer usable code for applying a function to the arrival delay to compute the congestion value of the networking component.

* * * * *